(12) United States Patent
Farahat et al.

(10) Patent No.: US 9,002,852 B2
(45) Date of Patent: Apr. 7, 2015

(54) MINING SEMI-STRUCTURED SOCIAL MEDIA

(71) Applicant: Adobe Systems Incorporated, San Jose, CA (US)

(72) Inventors: Ayman Omar Farahat, San Francisco, CA (US); Nesreen Kamel Abuseree Ahmed, West Lafayette, IN (US)

(73) Assignee: Adobe Systems Incorporated, San Jose, CA (US)

( * ) Notice: Subject to any disclaimer, the term of this patent is extended or adjusted under 35 U.S.C. 154(b) by 155 days.

(21) Appl. No.: 13/677,927

(22) Filed: Nov. 15, 2012

(65) Prior Publication Data

US 2014/0136541 A1     May 15, 2014

(51) Int. Cl.
*G06F 7/00*     (2006.01)
*G06F 17/30*    (2006.01)

(52) U.S. Cl.
CPC .................................. *G06F 17/3089* (2013.01)

(58) Field of Classification Search
CPC .. G06Q 50/01; G06F 17/30705; H04L 51/32; H04L 12/588
USPC ........................................................ 707/740
See application file for complete search history.

(56) References Cited

U.S. PATENT DOCUMENTS

| 4,914,590 | A | 4/1990 | Loatman et al. |
| 7,092,871 | B2 | 8/2006 | Pentheroudakis et al. |
| 7,409,362 | B2 | 8/2008 | Calabria |
| 7,451,161 | B2 | 11/2008 | Zhu et al. |
| 7,930,647 | B2 * | 4/2011 | Skrenta .......................... 715/788 |
| 8,392,360 | B1 * | 3/2013 | Dicker et al. .................. 707/608 |
| 8,549,013 | B1 * | 10/2013 | Sarma et al. ................... 707/748 |
| 8,626,769 | B1 * | 1/2014 | Bhatt ............................. 707/740 |
| 2002/0035643 | A1 * | 3/2002 | Morita .......................... 709/245 |
| 2002/0120619 | A1 * | 8/2002 | Marso et al. ....................... 707/3 |
| 2007/0208614 | A1 * | 9/2007 | Arnett et al. .................... 705/10 |
| 2007/0214097 | A1 | 9/2007 | Parsons et al. |
| 2007/0233551 | A1 * | 10/2007 | Levy et al. ...................... 705/10 |
| 2008/0215607 | A1 * | 9/2008 | Kaushansky et al. ......... 707/102 |
| 2008/0270225 | A1 * | 10/2008 | Beygelzimer et al. .......... 705/11 |
| 2009/0164199 | A1 | 6/2009 | Amidon et al. |
| 2010/0121849 | A1 * | 5/2010 | Goeldi .......................... 707/736 |
| 2010/0132049 | A1 | 5/2010 | Vernal et al. |
| 2010/0293170 | A1 * | 11/2010 | Hall et al. ...................... 707/750 |
| 2011/0209043 | A1 * | 8/2011 | Guo et al. ...................... 715/230 |
| 2011/0307312 | A1 * | 12/2011 | Goeldi .......................... 705/14.6 |
| 2011/0314041 | A1 * | 12/2011 | Drucker et al. ............... 707/769 |

(Continued)

OTHER PUBLICATIONS

Wenqi Shen "Essays on Online Reviews: The Relationships Between Reviewers, Reviews, and Product Sales, and the Temporal Patterns of Online Reviews" Oct. 15, 2008 Krannert School of Management at Purdue University West Lafayette, IN pp. 1-75.

*Primary Examiner* — Binh V Ho
(74) *Attorney, Agent, or Firm* — Wolfe-SBMC

(57) ABSTRACT

Methods and apparatus for analysis of semi-structured social media are described. A method comprises classifying a plurality of user-generated content entries into a plurality of categories based at least in part on an analysis of respective structured components of at least a subset of the plurality of entries. The method further includes determining, based at least in part on an analysis of additional components of entries of a particular category, a set of representative content elements of entries of the particular category, and generating a report that comprises one or more representative content elements of the particular category.

20 Claims, 7 Drawing Sheets

(56) References Cited

U.S. PATENT DOCUMENTS

| | | | |
|---|---|---|---|
| 2012/0047219 A1* | 2/2012 | Feng et al. | 709/207 |
| 2012/0117059 A1 | 5/2012 | Bailey et al. | |
| 2013/0103667 A1* | 4/2013 | Minh | 707/709 |
| 2013/0159348 A1* | 6/2013 | Mills et al. | 707/777 |
| 2013/0173254 A1* | 7/2013 | Alemi | 704/9 |
| 2013/0173612 A1* | 7/2013 | Shah et al. | 707/731 |
| 2013/0212180 A1* | 8/2013 | Work et al. | 709/204 |
| 2013/0231975 A1* | 9/2013 | High et al. | 705/7.29 |
| 2013/0325550 A1* | 12/2013 | Varghese et al. | 705/7.31 |

* cited by examiner

US 9,002,852 B2

MINING SEMI-STRUCTURED SOCIAL MEDIA

BACKGROUND

In recent years, interactive Internet-based platforms that enable individuals to share, discuss and respond to user-generated content have become more and more popular. Such platforms, which are often referred to using the term "social media", have in come cases attracted hundreds of millions of registered users worldwide within a decade. The total number of user-generated content entries such as product and service reviews, user status updates, micro-blog entries, and the like, has grown correspondingly, and continues to grow rapidly. A number of the vendors providing social media platforms have attempted to monetize some of the user-generated content, for example by attempting to target advertisements to users deemed likely to be interested in the corresponding products or services.

Several types of user-generated content, especially on review web sites, may contain data that can potentially be useful to various business entities in ways not directly related to advertising, e.g., in understanding which products or services are working well and which need to be modified, or in identifying the specific nature of the shortcomings in their current portfolios of products and services. However, because of the unstructured nature of at least some parts of the content, and because of the rapid rate at which the content is growing, it may not be straightforward to extract useful insights that could in principle be obtained from user-generated feedback.

SUMMARY

Various embodiments of methods and apparatus for mining semi-structured social media are described. According to one embodiment, a computer-implemented method may include classifying a plurality of user-generated content entries into a plurality of categories based at least in part on an analysis of respective structured components of at least a subset of the plurality of entries. The method may include determining, based at least in part on an analysis of additional components of entries of a particular category, a set of representative user-generated content elements of entries of the particular category. The method may further comprise generating a report that includes one or more of the representative user-generated content elements of the set.

DETAILED DESCRIPTION OF EMBODIMENTS

Various embodiments of methods and apparatus for mining of semi-structured social media are described. According to some embodiments, one or more computing devices may be configured to implement a tool for analysis of user-generated content entries obtainable from one or more social media platforms. At least some of the content entries may address one or more topic of interest to one or more entities such as businesses, political parties, governmental agencies and the like—e.g., a restaurant may be interested in user-generated reviews, a political party may be interested in policy discussions, and so on. Accordingly, the analysis tool may be utilized by such entities. The tool, which may be referred to herein as a "content analyzer", may be responsible for collecting the user-generated content entries from a variety of data sources (such as public or private web sites or databases) using a variety of techniques. The content analyzer may collect user-generated content entries that include both structured components (e.g., elements such as numerical ratings provided by users as feedback for a particular service or product), as well as unstructured components (such as text comments of arbitrary length) in some embodiments. The content analyzer may, in at least some embodiments, examine the structured components of content entries to classify at least some of the entries into categories (such as, in one simple example, "positive" and "negative" review categories for a particular product or service). The content analyzer may perform analysis of the additional components (e.g., the unstructured text comments) of the entries of one or more categories in such embodiments to identify representative content elements such as frequent word combinations or phrases, for example using statistical or semantic analyses. The representative content elements corresponding to at least some of the categories may be provided in a report to one or more clients of the content analyzer (such as the providers of the services or products on which user-generated comments or feedback was generated) in some embodiments.

Figure 1:
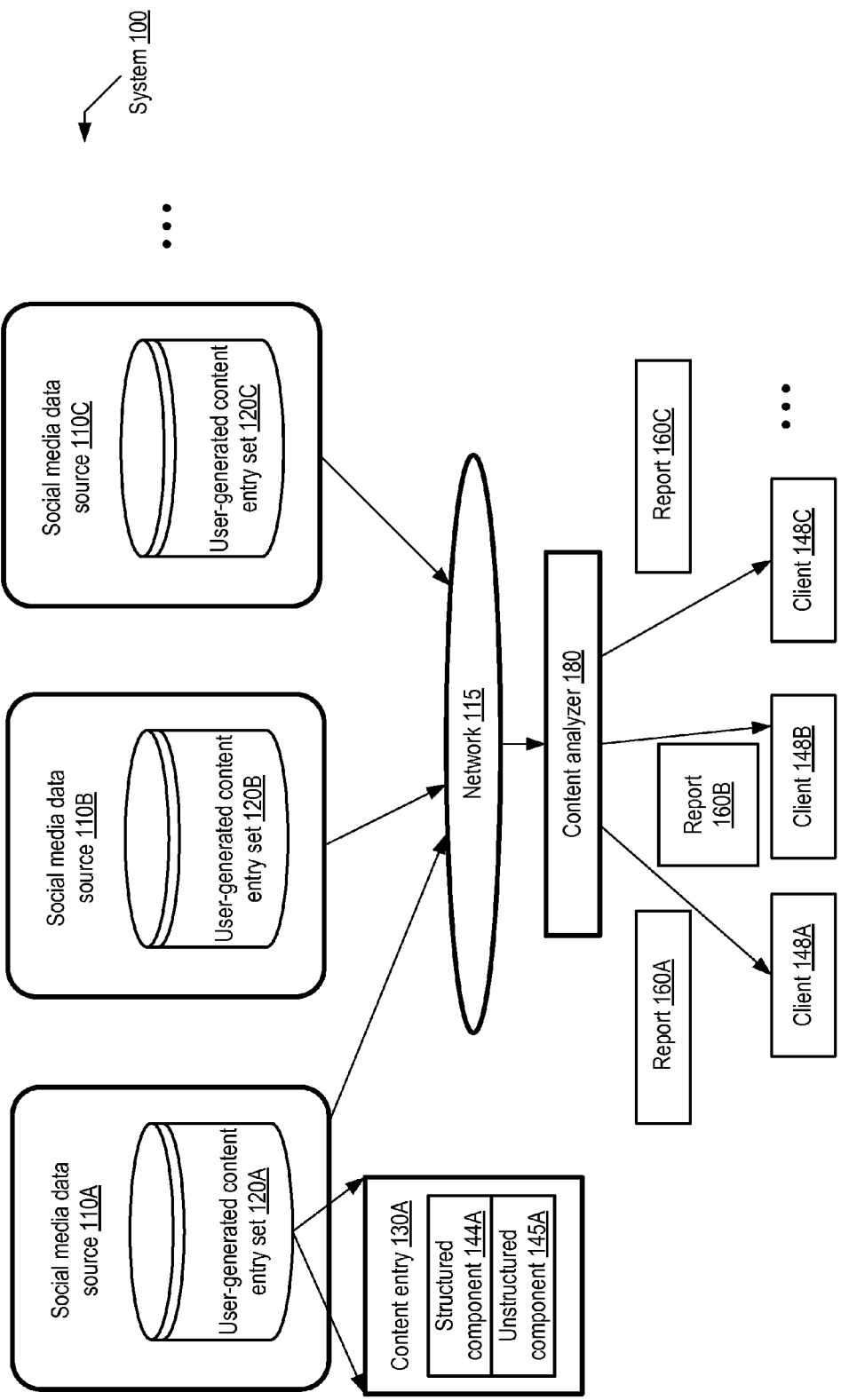
FIG. 1 illustrates an example system environment, according to at least some embodiments.

FIG. 1 illustrates an example system environment, according to at least some embodiments. System 100 includes a plurality of social media data sources 110, such as source 110A, 110B and 110C. The data sources 110 are accessible from a content analyzer 180 via a network 115 in the depicted embodiment. Each data source 110 comprises a corresponding user-generated content entry set 120—e.g., data source 110A includes an entry set 120A, data source 110B includes an entry set 120B, and data source 110C comprises an entry set 120C. A content entry 130 (such as the illustrated entry 130A) may include both a structured component 144 and an unstructured component 145 (such as respective components 144A and 145A of entry 130A). The structured component of a content entry may include data that can at least in principle be organized according to a schema with a defined set of fields of respective data types in at least some embodiments, so that, for example, it may be possible to quickly extract the numerical value of a given field, or a date value of a given field, from the structured component of a given content entry. It is noted that the content entries may not necessarily be stored in a traditional relational database with a formal schema definition in at least some embodiments, although database systems may be employed in some cases. Unstructured components of the content entries may include, for example, text comments that may vary in length, number of paragraphs, and so on, and may not conform to any imposed organizational structure. In some embodiments the unstructured components may include non-text components as well, such as video, audio, still images, drawings, symbols such as emoticons, and the like. It is also noted that the unstructured components of user content entries, such as text comments submitted by a user, may themselves be stored in fields defined in a schema—e.g., unstructured text comments may be stored in a particular column of a table whose other columns contain the structured components of the entries. In some embodiments, some of the content entries 130 may comprise a blank or null unstructured component 145, or a blank or null structured component 144—that is, not all the content entries may comprise both types of components.

The content analyzer 180 may collect or obtain the content entries 130 from the data sources 110 using a variety of approaches in different embodiments. Some data sources 110 in the depicted embodiment may implement or support public or private application programming interfaces (APIs) which may be invoked to retrieve the content entries, e.g., in XML (extensible markup language) or JSON (JavaScript Object Notation) format. Other data sources 110 may provide user-generated entries on web pages, from which the contents may be retrieved in some implementations using web scraping or screen scraping techniques. For example, in one embodiment, a tool that retrieves the HTML (HyperText Markup Language) or XHTML (Extensible HyperText Markup Language) component of a web page containing user-generated content entries may be employed, and the retrieved markup language may be parsed to separate the various structured elements of the user-generated content from the unstructured elements. In one implementation the user-generated data may be collected in image format (e.g., in a bitmap) and analyzed using optical character recognition techniques. In at least some embodiments, the social media data source 110 may itself store the user-generated content entries in a database, such as a relational database management system (RDBMS) or a non-relational or NoSQL database management system, and the content analyzer 180 may be enabled to submit database queries using any appropriate query language to retrieve the entries 130. In at least some embodiments, a social media data source 110 may be maintained by a particular business entity (such as an Internet-based retailer) that collects user feedback on its products or services. Such an entity may wish to utilize the functionality of the content analyzer 180, and may expose programmatic interfaces allowing the content analyzer 180 to extract the user feedback for which analysis is desired.

In the embodiment shown in FIG. 1, the content analyzer 180 may be configured to classify collected user-generated content entries into a plurality of categories. Categories may be defined based on a number of different criteria in different embodiments, such as the kinds of structured content components available, the total number of entries to be analyzed, or specific guidance provided by clients 148 (e.g., client 148A, 148B or 148C) of the content analyzer. In at least one embodiment, the structured part of the user-generated content entries associated with a particular service or product may include a rating value provided by the users, and the range of rating values detected in the entries (or the range allowed in the rating scheme) may be used to categorize the entries. For example, in one implementation the set of entries 130 collected for a particular restaurant may include a rating between one and five stars for the restaurant. In such a scenario, a given entry may be classified as a "positive" entry the user specified four or five stars, and as a "negative" entry if the user specified one or two stars. Entries in which the user specified three stars may be classified as "neutral" in some such implementations, or three-star entries may simply be discarded for the purpose of analysis as they may be assumed to provide less useful feedback than the more extreme positive and more extreme negative entries. In some embodiments, the structured components of user-generated content entries focused on feedback may comprise elements different from absolute ratings—e.g., in some embodiments, users may provide rankings (e.g., relative ordering of a product or service) instead of ratings, and the rankings may be used for classification of the entries. It is noted that while in some of the following description, user-generated content entries focused on feedback (such as ratings and rankings) are provided as examples, the functionality of content analyzer 180 described herein is not limited to feedback-related entries. The content analyzer 180 may be employed to analyze various types of user-generated content (including content that does not comprise specific feedback indicators such as ratings or rankings, such as blog or microblog entries describing various activities users perform, music users listen to, and so forth) in various embodiments.

In at least some embodiments, structured components other than ratings or rankings may be used for classification. For example, a particular business entity may have launched a marketing campaign, or implemented a change in strategy, on a particular date, and the user-generated entries may be classified into pre-launch and post-launch categories in the case of the marketing campaign, or into pre-strategy-change and post-strategy-change categories in the case of the change in strategy. Content entries 130 may also be classified based on the dates on which they were created, based on the geographic locale (e.g., city, state, region or country) in which a service or product being discussed was provided, or based on other demographic information regarding the users that generated the content (such as the geographic locations of the users, their ages, income levels, gender, and so on, in scenarios where such demographic information can be obtained or estimated). In some embodiments, the users or customers of a given product, service or business may be classified into groups based on their behavior—such as frequent buyers versus occasional buyers, anonymous clients versus registered clients, customers who spend more than X per month on a service versus customers who spend less than X, frequent-user-club members versus non-members, and so on. Such user groups may be used to classify the content entries in some embodiments—for example, entries from customers that spend more than $500 per month on a given service may be classified in first category, and entries from customers than spend less than $100 on the given service may be classified in a second category. In at least some embodiments, some of the structured data that can be used to classify the entries may have to be inferred or deduced by the content analyzer 180—e.g., a particular user may not necessarily identify themselves as spending more than $500 per month in any given content entry, but the amount spent may be determined or estimated based on various other content entries generated by the same user.

Having partitioned the content entries into categories based at least in part on some of the structured components of the entries, the content analyzer 180 may in some embodiments proceed to analyze the additional (unstructured) components of the entries of a given category, e.g., to identify representative elements such as frequent word combinations or phrases in scenarios where the unstructured components comprise natural language text. In some implementations the analysis of the unstructured content may involve one or more preliminary conversion steps—e.g., if the unstructured component includes video or audio comments, text may have to be extracted from the video or audio. The unstructured components of the entries may be analyzed using either a statistical approach, a semantics-based approach, or a combination of statistics and semantic analysis in different embodiments. For example, in one implementation the content analyzer 180 may first classify a data set of review entries for a particular restaurant into a positive review set P and a negative review set N based on the number of stars (a structured component of the reviews) assigned to the restaurant. Then, the unstructured components of P's entries may be examined separately from the unstructured components of N's entries.

Each of P's (and N's) entries may be processed via an analysis pipeline comprising a number of steps in one embodiment, such as tokenization, stemming, stop-word removal, n-gram computation, part-of-speech tagging and chunking. Tokenization may comprise extracting elements such as words and separators such as periods, commas, other punctuation marks, paragraph boundaries, and the like. Stemming may include reducing derived words to their stem, base or root word—for example, the words "order, orders, ordered, ordering, re-order" taken from restaurant reviews may all be reduced to the word "order". In a stop words removal step, words that are assumed not to be significant to the meaning of a type of content entry, such as "the", "is", "at", "which" or "on", may be filtered out of the unstructured components. The stop words that are used may differ for different product types of service types in some implementations—e.g., some words that may be considered not especially relevant to airline reviews may be considered more relevant for gardening service reviews, so different sets of stop words may be removed for airline-related content entries than the set of stop words removed from the gardening service reviews. N-gram computation may involve identification of repeated occurrences of N consecutive words or tokens in the text. As the name implies, part-of-speech tagging may involve identifying the particular part of speech (such as noun, verb, adjective, etc.) for which a token is being used in a given context. Chunking may involve combining tokens to form noun phrases, verb phases and the like. In some embodiments, other natural language processing techniques than those described above may be used. The analysis of the unstructured components and the structured components of the content entries may be performed using any appropriate programming or scripting language in various embodiments.

As a result of the analysis of the unstructured components of the content entries for each of the categories of interest, the content analyzer 180 may obtain a collection of representative elements such as frequent word combinations or phrases corresponding to each category in some embodiments. It is noted that although frequent word combinations are provided as an example of the types of representative elements that the content analyzer may find in much of the following description, other types of representative content elements may be determined by the analyzer in different embodiments. For example, in some embodiments, user-generated content may include graphical elements, such as emoticons or other types of non-textual symbols, sounds, videos or images, and the representative elements for a given category may comprise such non-text symbols, or combinations of text and non-textual symbols. The content analyzer may then prepare a report 160 (which may be termed a "feedback report" in cases where feedback-focused content is being analyzed) that includes the representative content elements for one or more categories, such as report 160A prepared for client 148A of FIG. 1, report 160B for client 148B, or report 160C for client 148C. In a simple implementation, a given report may comprise a definition of one or more categories of user-generated content (e.g., the definitions of "positive" and "negative" restaurant reviews), as well as a listing of the representative or frequent elements found for each of the categories. In scenarios where the report comprises frequent word combinations, the frequent word combinations may be sorted within the report based on various criteria in different embodiments. In one implementation, the combinations may be ranked based on their frequency of occurrence, or based on their correlation with the extent of positive or negative feedback in their containing content entries (e.g., word combinations that occurred frequently in 5-star reviews may be ordered above word combinations that occurred frequently in 4-star reviews). In some embodiments, a report 160 may include additional details, such as context information for some or all of the representative elements—e.g., examples of the entire sentences that contain a particular frequent word combination may be provided, or clickable links may be provided to contextual information. In at least some implementations, a set of recommended actions may be included in the report 160— e.g., if a frequent word combination for a set of airline feedback entries comprises the words "dirty seat covers", the content analyzer 180 may recommend that actions to clean airplane seat covers (or install new seat covers) be taken. In some embodiments, where for example it may be deemed desirable to obtain additional feedback related to a particular representative word combination or phrase, the content analyzer 180 may generate one or more suggested survey questions that may be used in follow-up surveys, either to the same set of users from whom the original content was received, or to all users. In at least some embodiments, clients 148 may be allowed to provide instructions or guidance regarding the types of information to be included in a report 160.

In some embodiments, especially in cases where the total number of user-generated entries 130 available for analysis is large, the content analyzer 180 may extract a subset of the available entries, and perform the analysis of the structured components and the unstructured components using the subset. For example, in one embodiment a client 148 may indicate selection criteria for choosing the set of entries to be examined, such as a range of dates for which the entries should be retrieved, or a particular geographical area from which user entries should be retrieved (i.e., the set of entries retrieved may be filtered based on the locations of the users that generated the entries). In some embodiments, the content analyzer 180 may provide trend information in its reports 160, e.g., by analyzing feedback for successive date ranges separately and indicating changes in the frequent word combination lists for each of the various date ranges. In one embodiment a programmatic interface may be provided to clients 148 enabling the clients to indicate desired grouping criteria for entries to be compared—e.g., a client 148 may provide a "before" grouping criteria and an "after" grouping criteria (e.g., representing time periods before and after a particular marketing event), and the content analyzer 180 may collect entries for "before" and "after" groups separately and include an indication of the differences between the frequent word combinations (or other representative elements) for the two groups in a report. In some embodiments the content analyzer 180 may combine structured data from more than one data source when classifying the content entries—e.g., it may be possible to retrieve, from a data source B, corresponding to a given entry 130A obtained from a data source 110A, additional demographic information about the individual that created the entry 130A, and such additional demographic information may be used in classifying the entry 130A. Depending, for example on the computational power of the devices used for the content analyzer 180 in a given implementation, very large numbers of entries (e.g., tens of millions of entries) may be analyzed within a short time period, allowing clients to quickly obtain insights into the impact of specific marketing campaigns or operational changes, as well as possible future adjustments in tactics and strategy.

Figure 2:
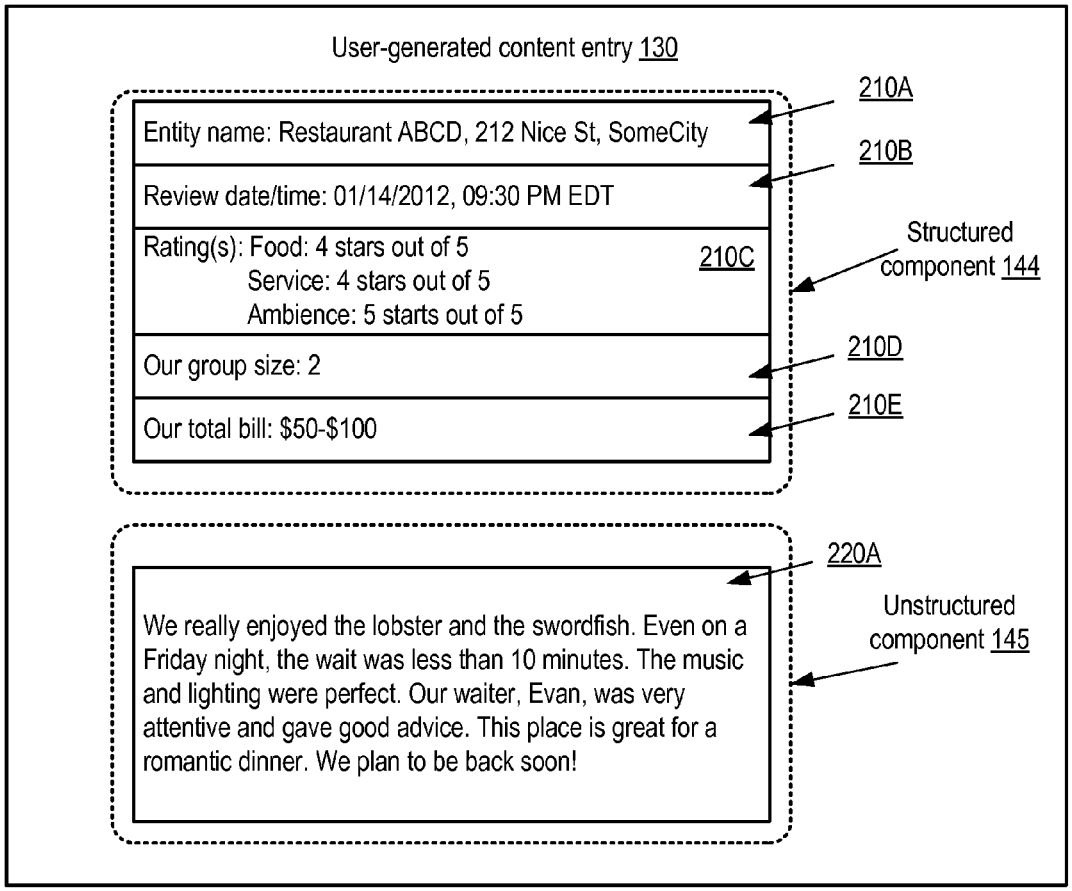
FIG. 2 illustrates an example of a user-generated content entry, according to at least some embodiments.

FIG. 2 illustrates an example of a user-generated content entry 130, according to at least some embodiments. As shown, the example entry 130 comprises a restaurant review, and includes a structured component 144 with a number of different fields, as well as an unstructured component 145. Structured component 144 includes entity identification field 210A (such as the name of the reviewed restaurant, "Restaurant ABCD", and its address), and a time and date field 210B indicating when the review was written. Several different ratings are included in field 210C, including respective star ratings for food, service and ambience. In the depicted example, the user also provides structured component field 210D indicating the number of individuals that participated in the meal that led to the review, as well as field 210E indicating the cost of the meal. The unstructured component 145 includes text comments 220A provided by the reviewer, indicating for example the dishes ordered by the reviewer's party, feedback about the wait for a table, the ambience, the waiter, and so on.

In different embodiments, depending on the nature of the service or product for which user-generated content is being provided, and/or on the platform being used to generate the content, different types of structured components may be available from a given set of user-generated entries 130. In some embodiments, the content analyzer 180 may be capable of targeting user-generated content for a number of different business domains—e.g., a given content analyzer 180 may be able to analyze restaurant reviews, hotel reviews, car rental reviews, airline reviews, cruise reviews. In one implementation, the content analyzer may comprise respective pluggable modules or libraries tailored for each of several domains—e.g., one module may be tailored for restaurant reviews, another for doctors and other healthcare providers, another for pest exterminators, and so on. In such an implementation, each module may be configured to detect domain-specific keywords or jargon, either for the structured data analysis, for the unstructured data analysis, or both.

At least in some embodiments, not all the entries 130 for a given service or product may contain the same structured component fields. For example, another user of the same feedback platform as was used to generate the review 130 of FIG. 2 may not bother to provide details of the group size or the total bill. The content analyzer 180 may be configured to respond to missing or unpopulated fields in various ways in different embodiments. For example, in one embodiment, for a given domain such as restaurant reviews, the content analyzer may be configured to include for analysis only those entries that include values for at least a specified set of structured data fields, and to reject other entries. In another embodiment, the content analyzer may attempt to infer or assign default values for some fields that are unpopulated, e.g., based on the analysis of those entries that do contain entries for a given field 210. For example, if 85% of a particular restaurant's reviews indicate that the total bill per person was between $30 and $50, and 15% of the reviews indicate no value for the total bill, the content analyzer may for the purposes of analysis assume that the bill per person value of $30-$50 is valid for all the reviews.

Figure 3:
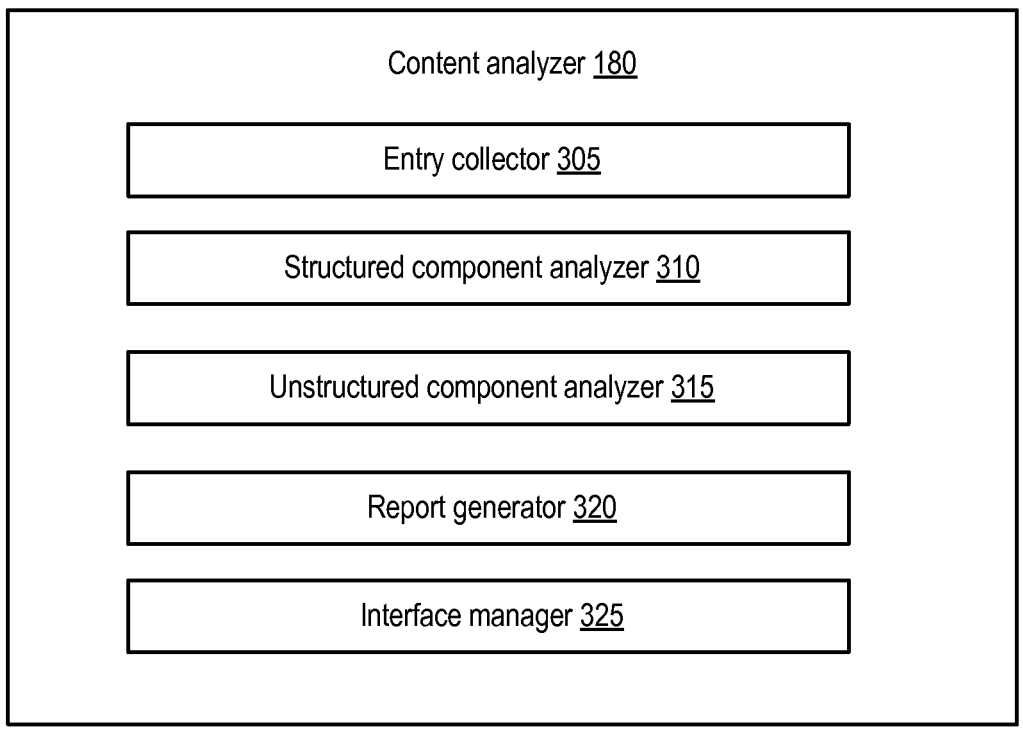
FIG. 3 illustrates examples components of a content analyzer tool, according to at least some embodiments.

FIG. 3 illustrates examples components of a content analyzer 180, according to at least some embodiments. As shown, the content analyzer may comprise an entry collector 305, a structured component analyzer 310, an unstructured component analyzer 315, a report generator 320 and an interface manager 325. In some embodiments the content analyzer may be implemented as an installable software tool that may be installed and executed on a general purpose computing server, or on a cluster of more than one server. In other embodiments the functionality of the content analyzer may be implemented as part of a network-accessible service, such as a multi-tenant service to which clients 148 may subscribe. The various components illustrated in FIG. 3 may be implemented as respective modules of the tool or service in various embodiments.

Entry collector 305 may be configured to obtain the user-generated content entries from various social media data sources 110 in the depicted embodiment. For example, one or more of the data sources 110 may provide an API, and entry collector 305 may utilize a software library that invokes various interfaces of the API supported by each of the data sources of interest to retrieve the user-generated content entries. As noted earlier, in some embodiments it may be possible to extract content entries from the publicly-available web pages of a social media platform's web site, e.g., using a web-scraping or screen-scraping approach. Depending on the format in which the entries are retrieved, an additional step of optical character recognition or its equivalent may be required in some embodiments, e.g., when the user-generated content entries are retrieved in an image format rather than as text. Entry collector 305 may also be capable of transmitting database queries, using any appropriate query language or query interface such as various SQL (Structured Query Language) based languages in some embodiments to obtain the user-generated content entries. In some embodiments, one or more of the data sources 110 may support search interfaces which may be used by entry collector 305 to filter the types of content entries that are retrieved. In at least some embodiments, the entry collector may collect only a subset of the available content entries—for example, if ten million of content entries are available for a given service or product, a random sampling approach may be used, and only one million entries may be retrieved.

Structured component analyzer 310 may be configured to identify the values of the various structured component fields (such as fields 210 of FIG. 2) of user-generated entries 130 in the depicted embodiment. The structured component analyzer 310 may also be configured to classify content entries 130 into different buckets or categories based on the identified structured field values. In some embodiments, structured information about a given entry 130 may have to be determined indirectly, i.e., from a source other than the contents of the entry itself. For example, a particular review web site may require users to register before they post reviews, and the registration process may require that the users provide demographic information (e.g., home address, age, gender and the like) in some embodiments. Such demographic information may be stored in a user database, to which at least in some cases the content analyzer 180 may be provided access by the business entity that maintains the review web site. When analyzing a review from a particular user U1, the demographic information for U1 may be retrieved in at least some implementations by the structured component analyzer 310, and may be used to help classify U1's entry. In some embodiments, the structured component analyzer 310 may classify content entries 130 along multiple dimensions. For example, as shown in FIG. 2, restaurants may be rated separately for different characteristics—such as food, service and ambience in FIG. 2. The structured component analyzer 310 may use each of the different types of ratings values for a corresponding classification in some implementations, such as one set of categories for food, another set of categories for service, and another set for ambience. In other implementations the structured component analyzer 310 may combine the separate ratings values of a given content entry to derive a composite or blended rating, and use the composite rating for classification.

Unstructured component analyzer 315 may be responsible for identifying meaningful representative elements, such as frequent word combinations in the unstructured portions of content entries of one or more categories in the depicted embodiment, e.g., using any appropriate combination of statistical approaches, semantic approaches, or linguistic approaches. In some embodiments, where for example the user-generated content 130 may be produced in any of multiple languages (e.g., reviewers may provide comments in English, Spanish or French), a separate unstructured component analyzer may be implemented for each language. In at least some embodiments, either the structured component analyzer, the unstructured component analyzer, or both, may be implemented using machine learning techniques such that the quality of their analysis improves over time as the total number of user-generated content entries analyzed increases.

Report generator 320 may be responsible for producing reports 160 that include the representative elements such as frequent word combinations or phrases identified by the unstructured component analyzer 315, and providing the reports in the desired format to the clients 148. The clients 148 may include, for example, employees of various business entities, governmental agencies, or associations such as political parties, non-governmental groups, and the like, in different embodiments. In some embodiments where frequent word combinations are provided, in addition to the frequent word combinations themselves, the report generator 320 may also include context information (e.g., examples of the specific sentences in which the word combinations were found) associated with the word combinations in the reports. In one embodiment, the report generator may also include recommendations based on the representative elements— e.g., a given report 160 may include suggested questions to be included in a survey to obtain further feedback about some frequent word combinations or phrases, or suggestions about process changes that should be implemented to improve user satisfaction with a service or product. The unstructured component analyzer 315 may provide the report generator with the context information and/or the recommendations in at least some embodiments. In one embodiment the report generator 320 and/or the unstructured component analyzer 315 may utilize a knowledge base that includes information on the success or failure of previously-provided recommendations, and such a knowledge base may be consulted when generating suggestions to be included in the report.

Interface manager 325 may be configured to implement one or more programmatic interfaces (such as web pages, APIs, or the like) allowing clients 148 and/or data sources 110 to communicate with content analyzer 180. Clients 148 may be able to submit requests for analysis, provide guidance on the contents or format of reports 160, and/or provide feedback on the perceived quality of the content analyzer's functionality using the programmatic interfaces in the depicted embodiment. The interface manager may publish one or more APIs in some embodiments, which may be used by one or more social media data sources 110 to push user-generated content entries to the content analyzer, instead of or in addition to the content analyzer's pulling the content entries from the data sources. It is noted that the content analyzer 180 may comprise additional components not explicitly shown in FIG. 3 in some embodiments, and that some of the components illustrated in FIG. 3 may be omitted in other embodiments.

Figure 4:
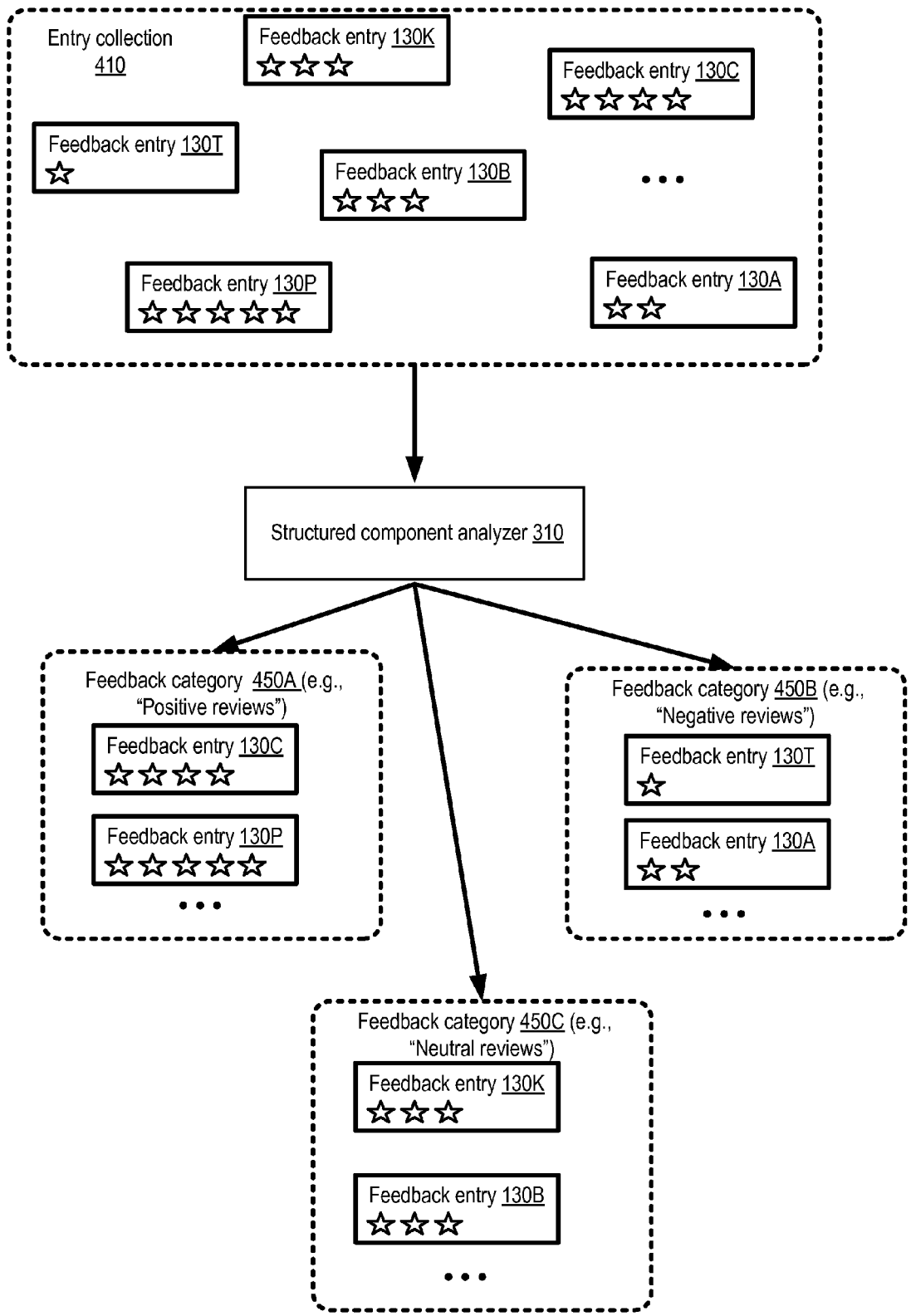
FIG. 4 illustrates aspects of the analysis of structured components of user-generated content entries, according to at least some embodiments.

FIG. 4 illustrates aspects of the analysis of structured components of user-generated content entries 130, according to at least some embodiments. An example of feedback-focused user-generated content entries comprising "star ratings" is shown. A collection 410 of user-generated feedback entries 130, including 130A, 130B, 130C, 130K, 130P and 130T may be obtained (e.g., by an entry collector 305 similar to that shown in FIG. 3) for examination by the structured component analyzer 310 in the depicted embodiment. The structured component of each entry 130 comprises a star rating, of between one and five stars, with the number of stars awarded by a given user assumed to be indicative of the extent to which the service or product being evaluated was liked by the user in the depicted embodiment. A rating of five stars may thus indicate a highly positive evaluation by the user, while a rating of one star may indicate a highly negative evaluation.

The structured component analyzer 310 may classify the entries of collection 410 into a plurality of categories bases at least in part on the star rating. As shown, three categories, called "Positive Reviews", "Negative Reviews", and "Neutral Reviews" may be used in the illustrated example. Entries 130 that have four-star or five-star ratings may be classified as positive reviews, entries that have two or fewer stars may be classified as negative reviews, and entries that have three stars may be classified as neutral reviews. The number of different categories, and the category definitions or inclusion criteria, may be determined by the content analyzer for a given set of entries in some embodiments. In other embodiments, a client 148 may indicate the category definitions or inclusion criteria of interest for a given entry set of interest, e.g., via a programmatic interface, and the content analyzer may use the client-provided definitions.

It is noted that not all the content entries may be of interest in some embodiments—e.g., a business entity may be interested in gaining insights primarily from positive and negative reviews, and not from neutral reviews, in which case the feedback entries representing neutral reviews may be discarded by the structured component analyzer 310. It is also noted that, as illustrated in FIG. 2, in some embodiments, a given content entry 130 may contain structured feedback on several attributes of a given product or service, and each of the different types of structured feedback (such as different star ratings for food versus service at a restaurant) may be used for a respective classification. Thus, for example, the same set of restaurant-related feedback entries may be classified into "Positive food reviews", "Negative food reviews", "Positive service reviews", and "Negative service reviews" categories, with a given entry being classified along the "food" and "service" dimensions using the corresponding star rating. In at least some embodiments, multiple categories of structured data associated with the feedback entries may be used in the classification step—e.g., if structured data about the size of the party that dined at a restaurant is available from the feedback entries that also contain star ratings for service, the entries may be divided into categories such as "Positive service reviews for groups of four or more diners", "Negative service reviews for groups of four or more diners", "Positive dining reviews for groups of two diners", "Negative dining reviews for groups of two diners", and so on. Additional types of structured data associated with the content entries may be used for classification in other embodiments, either singly or in combination, such as the date or time at which the content was generated or the service or product being reviewed or discussed was obtained, a geographical location of the user providing the feedback or the entity providing the service or product, the price the user paid, or demographic information about the users. In some embodiments, the analysis of user-generated content may be requested to determine the impact (if any) of a particular marketing campaign or business tactic, in which case the entries may be classified based on whether content was generated before or after the campaign or tactic was implemented.

Figure 5:
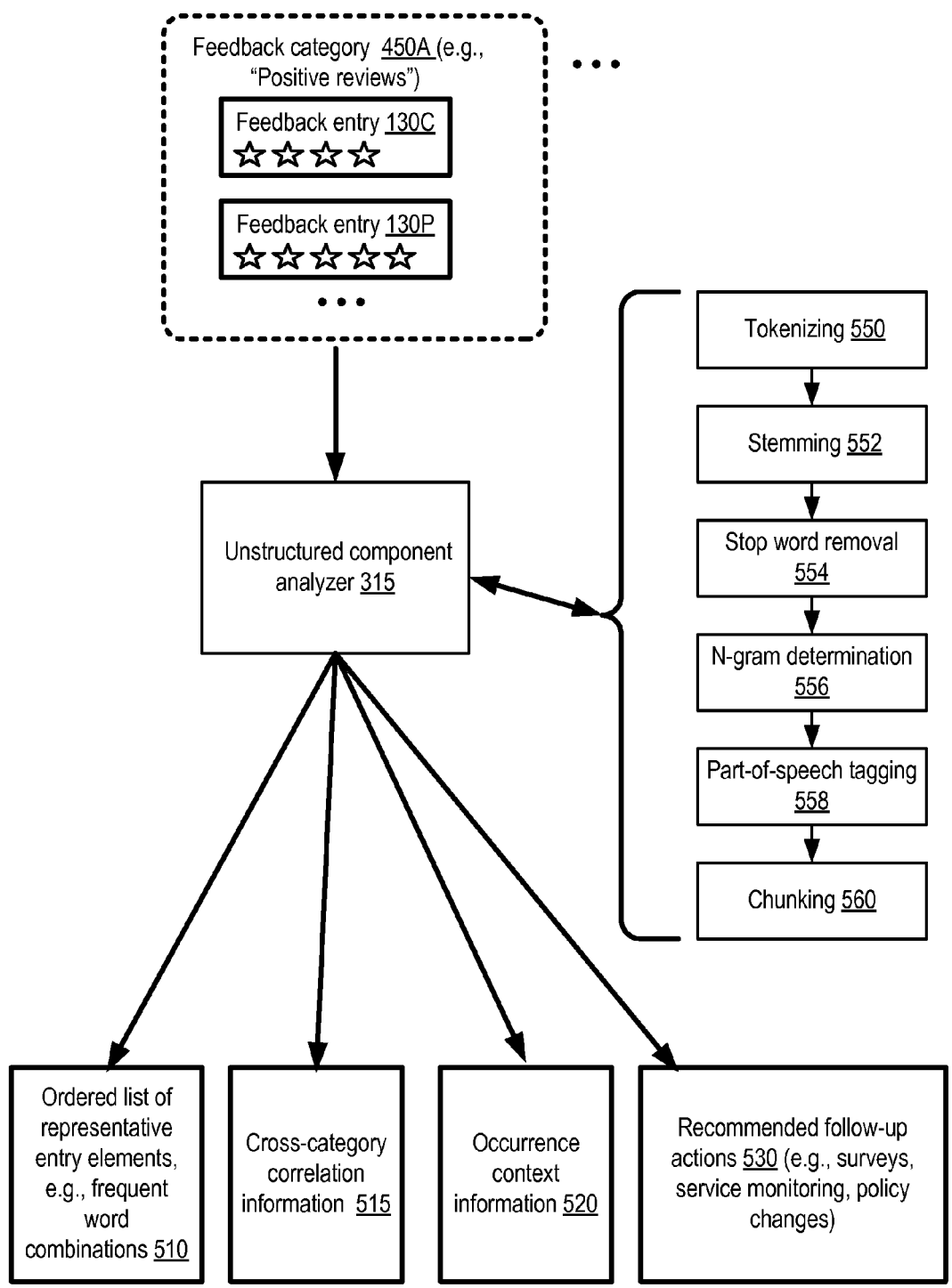
FIG. 5 illustrates aspects of the analysis of unstructured components of user-generated content entries, according to at least some embodiments.

FIG. 5 illustrates aspects of the analysis of unstructured components of user-generated content entries 130, according to at least some embodiments. Once again, feedback-related content entries comprising star ratings are used as an example. As shown, the unstructured component analyzer 315 of the content analyzer may examine the feedback entries corresponding to the categories into which the structured component analyzer has divided the entries. For example, if the entries have been divided into "Positive reviews", "Negative reviews" and "Neutral reviews", the unstructured component analyzer may analyze the unstructured components (comprising natural language text) of all the "Positive reviews" entries, with the goal of finding representative elements such as frequent word combinations among the positive reviews. Then, a similar analysis may be conducted on the unstructured components of the "Negative reviews" entries, to find common word combinations for that category, followed by a similar analysis iteration for "Neutral reviews". The unstructured component analyzer 315 may also be configured to find correlations or anti-correlations between the frequent word combinations of the different categories—e.g., those words or phases that occur more frequently in positive reviews and do not occur frequently in negative reviews may be identified In the depicted embodiment, as shown, the unstructured component analyzer 315 may provide four types of output: representative elements (such as frequent word combinations) 510, cross-category correlation information 515, occurrence context information 520, and recommended follow-up actions 530. An ordered list of representative elements 510 may be generated for each category, with the ordering based on selected criteria such as raw frequency of occurrence, the intensity of the positive or negative feedback in the entries in which the elements were found, and so forth. In some embodiments, a client 148 may be allowed to indicate or modify the sorting criteria for the frequent word combinations 510 or other types of representative elements. Cross-category correlation information 515 may, for example, identify those word combinations that occur frequently in one category but not in others, which may be helpful in isolating the specific perceived qualities of the service or product being evaluated that lead to the positive or negative reviews. If the phrase "low prices" appears frequently in the positive reviews of a restaurant, but infrequently in the negative reviews, in one example scenario, while the phrase "long wait" appears frequently in the negative reviews and infrequently in the positive reviews, it may be deduced that improving the wait time and keeping the prices low may help to improve customer satisfaction for the restaurant. In at least some embodiments, the unstructured component analyzer 315 may provide occurrence context information 520 for at least some of the representative elements 510—e.g., the sentences in which the word combinations occurred may be provided, or a clickable link to the sentences may be provided, so that a client 148 of the content analyzer may inspect the raw user feedback corresponding to word combinations of interest. The unstructured component analyzer 315 may also provide recommended follow-up actions 530, such as suggestions to conduct additional surveys to obtain more detailed feedback on some word combinations, suggestions for monitoring aspects of the service or product being provided, or suggestions for process improvement. For example, if some restaurant reviews indicate dissatisfaction with long wait times while others suggest that wait time was short, a suggestion to measure wait time trends during different days of the week or different hours of the day may be offered, to learn more specifics about when the problematic waits occur and whether they correlate with some other factor such as the wait staff on duty. In some embodiments a knowledge base on previously found frequent word combinations and the success or failure of corresponding previously-provided recommendations may be kept, which may be used to identify recommendations that may be useful.

In the embodiment depicted in FIG. 5, in which the unstructured components are assumed to include client-generated text, the unstructured component analyzer 315 may perform any combination of various types of natural language processing operations to identify representative elements 510 such as frequent word combinations. For example, in embodiments where the entries 130 comprise unstructured text comments, the text comments may be first tokenized (element 550 of FIG. 5) to isolate words and delimiters, followed by stemming (element 552) to obtain word roots from the tokens. Stop words such as "the" or "on" that are assumed not to contribute significantly to the meaning of the comments may then be removed (element 554). Then, N-grams or combinations of N words or tokens may be identified in the processed text (for one or more values of N, such as 2 or 3) (element 556), and the frequencies of occurrence of the N-grams may be determined within the category being examined. In some embodiments, the analysis of the unstructured components may also include part-of-speech tagging (element 558) in which the tokens or words of the unstructured components may be classified based on whether they are nouns, adjectives, verbs and the like. The tokens may then be combined into phrases, such as noun phrases or verb phrases, in a chunking step (element 560). It is noted that at least in some embodiments, only a subset of the analysis steps illustrated in FIG. 5 may be performed—e.g., in one embodiment a primarily statistical analysis may be conducted in which n-grams are identified but classification based on parts of speech is not performed. In another embodiment, primarily semantic analysis may be conducted to identify noun phases, verb phrases and the like, without computing n-grams.

Figure 6:
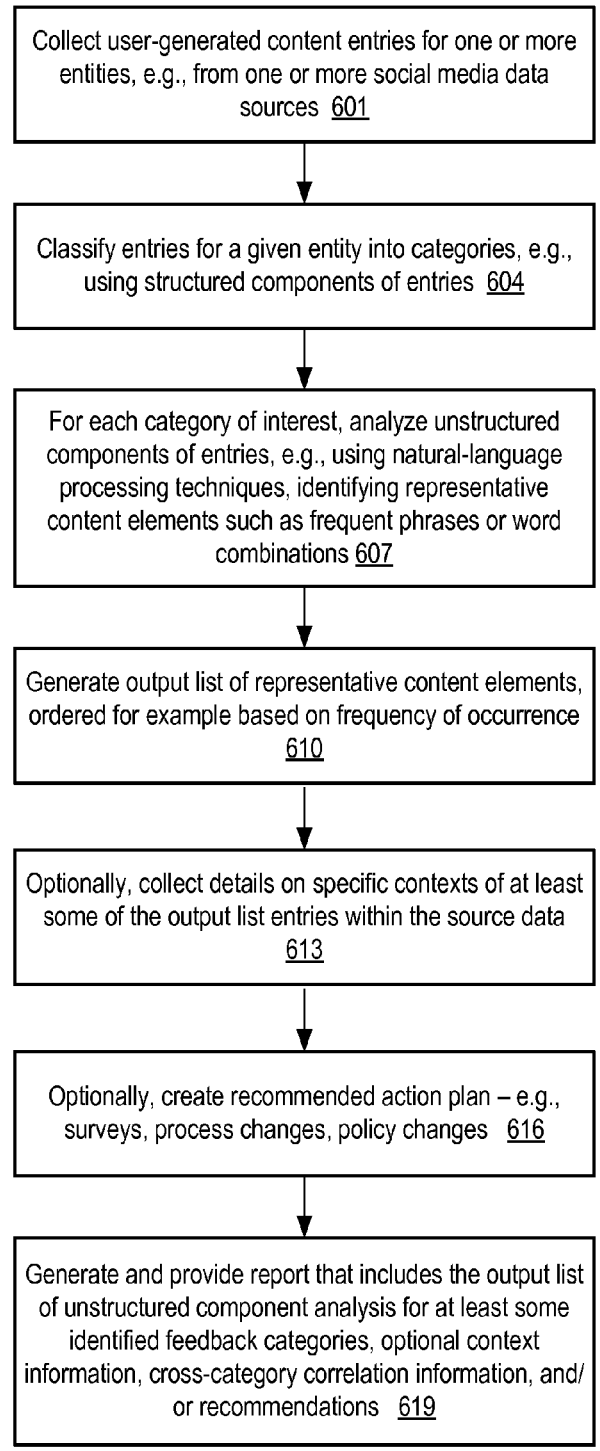
FIG. 6 is a flow diagram illustrating aspects of the operation of a content analyzer tool, according to at least some embodiments.

FIG. 6 is a flow diagram illustrating aspects of the operation of a content analyzer tool 180, according to at least some embodiments. As shown in element 601, the content analyzer may collect user-generated content entries from a plurality of data sources, such as one or more social media platforms. In some embodiments, the content analyzer may collect user-generated content regarding a variety of domains (e.g., restaurants, hotels, professional services and the like) and regarding a variety of business entities, while in other embodiments the collection of entries may be focused on feedback on a particular business entity or a particular type of service or product. The content entries for a given business entity, service or product may be classified into a plurality of categories, e.g., based at least partly on structured components of the collected entries (element 604). For example, as discussed above, review feedback entries may be classified into positive reviews and negative reviews.

As shown in element 607, for each category of interest, the content analyzer 180 may examine the unstructured components (such as text comments) of the entries of the category, to identify representative elements such as frequent word combinations or phrases in the entries. Any of a variety of natural language processing techniques, such as some of the techniques illustrated in FIG. 5, may be employed for the analysis of the unstructured data comprising text in the depicted embodiment. In some embodiments, the content analyzer may be sufficiently intelligent to identify not just frequent words or phrases, but also concepts or memes suggested by the frequent words or phrases. As shown in element 610, an output list of the representative elements such as frequent word combinations or phrases may be generated, ordered for example based on the frequency of occurrence. In at least some embodiments, non-textual unstructured components of user-generated content, such as graphical symbols, images, videos, or audio may be analyzed to determine representative content elements, in addition to or instead of the text analysis described above.

In some embodiments, as shown in element 613, additional context information such as pointers to (or examples of) the specific sentences in which representative elements such as word combinations or phrases occurred in the source entries may also be collected optionally. As shown in element 616, also optionally, recommended action plans may be created based on the representative elements found—e.g., the content analyzer 180 may suggest questions to be included in a survey, recommended process changes or policy changes, and the like. The content analyzer 180 may generate a report that includes the output of the unstructured component analysis (e.g., the frequent word combinations) for at least some of the categories into which the entries were classified (element 619). The report may also include other elements in some implementations, such as cross-category correlation information indicating word combinations that occur frequently in one category but not in others, or word combinations that occur frequently in multiple categories. In one embodiment, context information for the representative elements and/or any generated recommendations may also be provided in the report.

Figure 7:
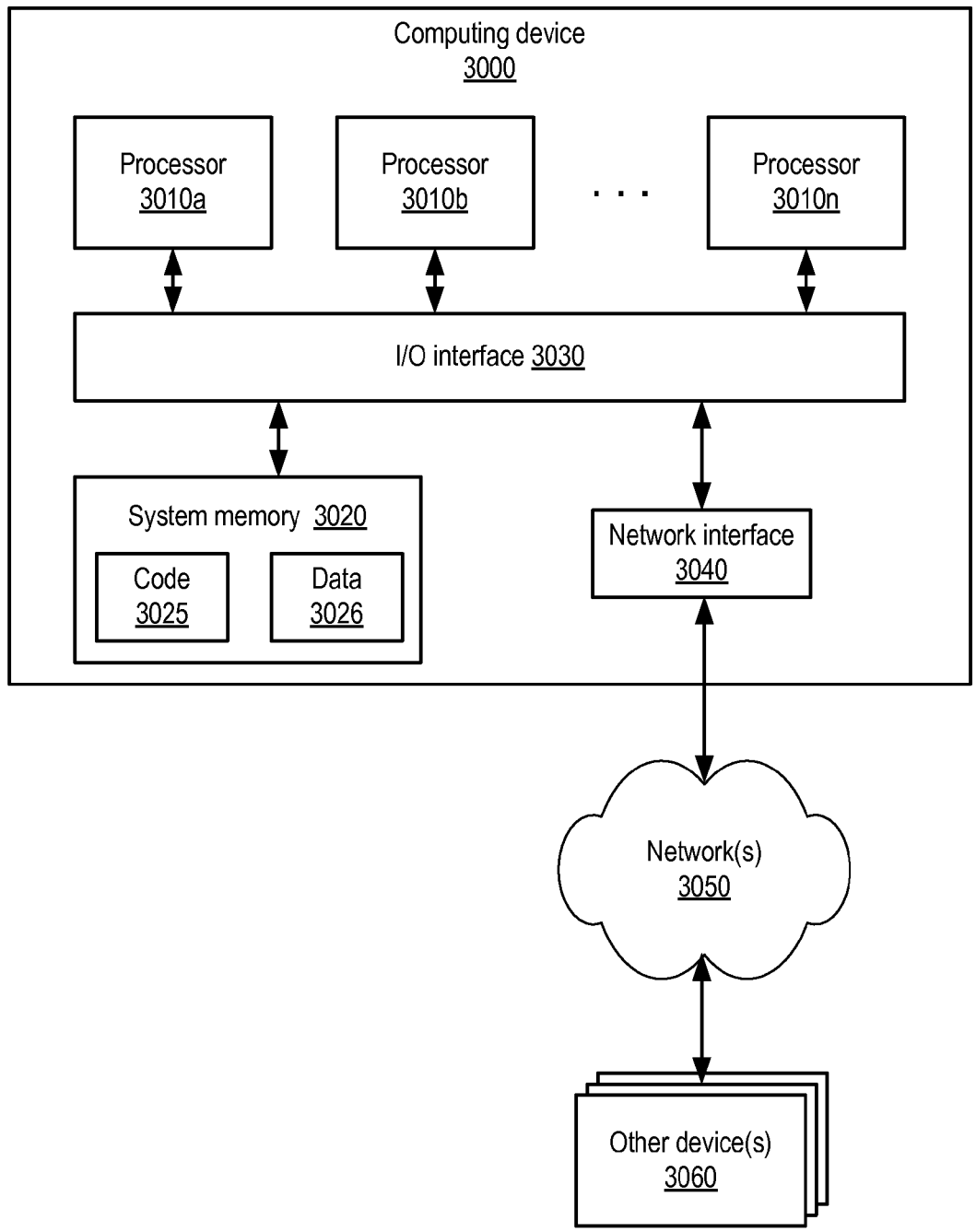
FIG. 7 illustrates an example computing device that may be used in some embodiments.

FIG. 7 illustrates an example computing device 3000 that may be used in some embodiments to implement at least some of the functionality of the content analyzer 180. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
collecting user-generated content entries from one or more social media data sources;
classifying the user-generated content entries into categories based at least in part on an analysis of respective structured components of at least a subset of the entries, the structured components including data organized in a defined set of fields of respective data types;
determining, based at least in part on a semantic analysis of unstructured components of the entries of a particular category, a set of representative user-generated content elements of the entries of the particular category comprising a set of frequent word combinations, the unstructured components including additional data of arbitrary length and not organized in the defined set of fields of the respective data types;
generating a report that comprises one or more of the representative user-generated content elements of the set of representative user-generated content elements of the entries of the particular category; and
generating, based at least in part on the report, a survey question in requesting additional feedback associated with a particular frequent word combination of the set of frequent word combinations.

2. The method as recited in claim 1, wherein the unstructured components comprise natural language text.

3. The method as recited in claim 1, wherein said collecting the user-generated content entries using at least one of: (a) a screen-scraping technique on a web page, (b) one or more invocations of an application programming interface (API), or (c) one or more database queries.

4. The method as recited in claim 1, wherein the structured component of a particular entry of the user-generated content entries comprises an indication of at least one of: (a) a user-selected rating level, (b) a date, (c) a geographical location, (d) a purchase price, or (e) a demographic category of a user.

5. The method as recited in claim 1, wherein the categories include at least one of: (a) a positive rating category, (b) a negative rating category, or (c) a neutral rating category.

6. The method as recited in claim 1, wherein the semantic analysis of an unstructured component of a particular entry of the particular category comprises an analysis of user-generated text to identify noun and verb phrases.

7. The method as recited in claim 1, wherein the semantic analysis of an unstructured component of a particular entry of the particular category comprises a semantic analysis of user text to identify parts of speech.

8. The method as recited in claim 1, wherein the set of representative user-generated content elements of the entries of the particular category comprises the set of frequent word combinations, wherein the report comprises an indication of a context in which a variant of a frequent word combination of the set of frequent word combinations occurred in a particular user-generated content entry.

9. A system, comprising:
one or more processors; and
a memory comprising program instructions executable by the one or more processors to:
collect user-generated content entries from one or more social media data sources;
classify the user-generated content entries into categories based at least in part on an analysis of respective structured components of at least a subset of the entries, the structured components including data organized in a defined set of fields of respective data types;
determine, based at least in part on a statistical analysis of unstructured components of the entries of a particular category, a set of representative user-generated content elements of the entries of the particular category comprising a set of frequent word combinations, the unstructured components including additional data of arbitrary length and not organized in the defined set of fields of the respective data types;
generate a report that comprises one or more of the representative user-generated content elements of the set of representative user-generated content elements of the entries of the particular category; and
generate, based at least in part on the report, a survey question in requesting additional feedback associated with a particular frequent word combination of the set of frequent word combinations.

10. The system as recited in claim 9, wherein the program instructions are executable by the one or more processors to:
collect the user-generated content entries using at least one of: (a) a screen-scraping technique on a web page, (b) one or more invocations of an application programming interface (API), or (c) one or more database queries.

11. The system as recited in claim 9, wherein an unstructured component of a particular entry of the particular category comprises natural language text, wherein the statistical analysis of the unstructured component comprises an n-gram analysis of user-generated text.

12. The system as recited in claim 9, wherein the statistical analysis of an unstructured component of a particular entry of the particular category includes tokenizing of user-generated text.

13. The system as recited in claim 9, wherein the set of representative user-generated content elements of the entries of the particular category comprises the set of frequent word combinations, wherein the report comprises a link to one or more contexts in which a variant of a particular frequent word combination of the set of frequent word combinations occurred in one or more of the user-generated content entries.

14. The system as recited in claim 9, wherein semantic analysis of an unstructured component of a particular entry of the particular category comprises a semantic analysis of user text to identify parts of speech.

15. A non-transitory computer-readable storage medium storing program instructions that when executed by a computing device implement:
collecting user-generated content entries from one or more social media data sources;
classifying the user-generated content entries into categories based at least in part on an analysis of respective structured components of at least a subset of the entries, the structured components including data organized in a defined set of fields of respective data types;

determining, based at least in part on a combination of statistics and semantic analysis of unstructured components of the entries of a particular category, a set of representative user-generated content elements of the entries of the particular category comprising a set of frequent word combinations, the unstructured components including additional data of arbitrary length and not organized in the defined set of fields of the respective data types;

generating a report that comprises one or more of the representative user-generated content elements of the set of representative user-generated content elements of the entries of the particular category; and generating, based at least in part on the report, a survey question in requesting additional feedback associated with a particular frequent word combination of the set of frequent word combinations.

16. The non-transitory computer-readable storage medium as recited in claim 15, wherein collecting the user-generated content entries using at least one of: (a) a screen-scraping technique on a web page, (b) one or more invocations of an application programming interface (API), or (c) one or more database queries.

17. The non-transitory computer-readable storage medium as recited in claim 15, wherein the structured component of a particular entry of the user-generated content entries comprises an indication of at least one of: (a) a user-selected rating level, (b) a date, (c) a geographical location, (d) a purchase price, or (e) a demographical category of a user.

18. The non-transitory computer-readable storage medium as recited in claim 15, wherein an unstructured component of a particular entry of the particular category comprises user-generated text, wherein the combination of statistics and semantic analysis of the unstructured component comprises a use of one or more of: tokenization, word-stemming, stop-word removal, n-gram computation, part-of-speech tagging, and chunking.

19. The non-transitory computer-readable storage medium as recited in claim 15, wherein the combination of statistics and semantic analysis of an unstructured component of a particular entry of the particular category includes identifying noun and verb phrases.

20. The non-transitory computer-readable storage medium as recited in claim 15, wherein the categories comprise a first category and a second category, wherein the respective sets of representative user-generated content elements of the entries of the first category comprise respective sets of frequent word combinations, and wherein the report comprises an indication of a particular frequent word combination identified in the first category that does not appear in a set of frequent word combinations for the second category.

* * * * *